US012609926B2

(12) United States Patent
　　　Uppalapati

(10) Patent No.:　　US 12,609,926 B2
(45) **Date of Patent:　　*Apr. 21, 2026**

(54) MULTI-TIER TOKENIZATION WITH LONG TERM TOKEN

(71) Applicant: Synchrony Bank, Stamford, CT (US)

(72) Inventor: Ashok Uppalapati, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,425

(22) Filed: Jul. 19, 2024

(65) Prior Publication Data

US 2025/0030684 A1　　Jan. 23, 2025

Related U.S. Application Data

(63) Continuation of application No. 17/732,009, filed on Apr. 28, 2022, now Pat. No. 12,069,046.

(60) Provisional application No. 63/182,281, filed on Apr. 30, 2021.

(51) Int. Cl.
　　*H04L 29/06*　　　(2006.01)
　　*G06F 21/00*　　　(2013.01)
　　*G06Q 20/38*　　　(2012.01)
　　*H04L 9/40*　　　(2022.01)
(52) U.S. Cl.
　　CPC ..... *H04L 63/0853* (2013.01); *G06Q 20/3825* (2013.01); *H04L 63/04* (2013.01)

(58) Field of Classification Search
None
See application file for complete search history.

(56) References Cited

U.S. PATENT DOCUMENTS

2002/0064149 A1 * 5/2002 Elliott ..................... H04L 41/18
　　　　　　　　　　　　　　　　　　　370/352
2018/0145835 A1 * 5/2018 Barbour ............... H04L 9/3263

OTHER PUBLICATIONS

Notice of Allowance mailed Apr. 26, 2024 in U.S. Appl. No. 17/732,009.

* cited by examiner

*Primary Examiner* — Lisa C Lewis
(74) *Attorney, Agent, or Firm* — Polsinelli LLP

(57)　　　　　ABSTRACT

Examples describe data security for communication systems. One example includes validating a user device using secure user data and generating a long term token for the user device, where the long term token is generated with a randomized unique token system. The method further includes receiving a transaction communication associated with a secure transaction, the transaction communication including the long term token, generating a transaction token that is different than the long term token for the transaction communication using the long term token from the transaction communication, and facilitating the secure transaction using the transaction token and the long term token.

20 Claims, 8 Drawing Sheets

Figure 2:
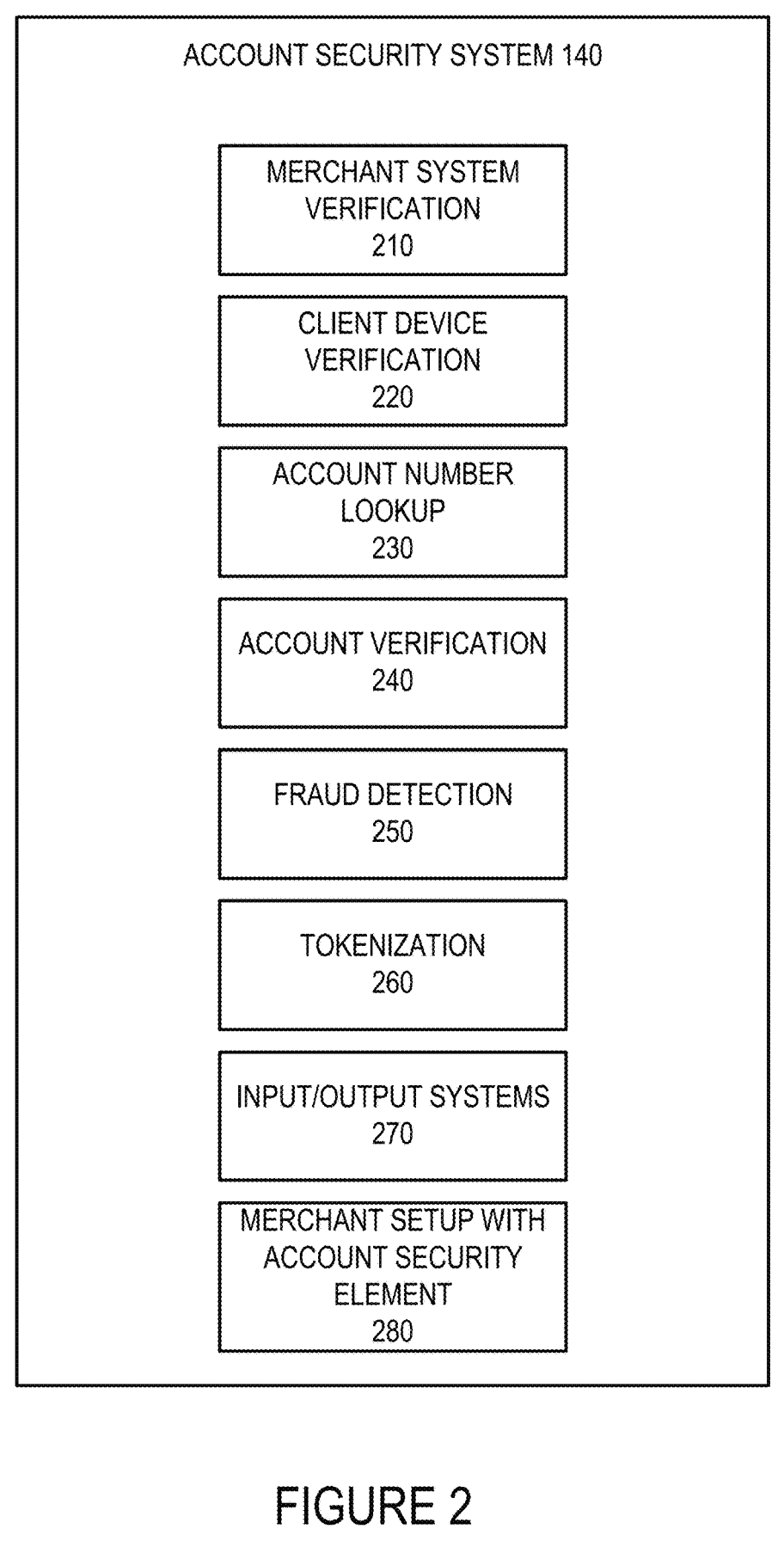

ACCOUNT SECURITY SYSTEM 140

MERCHANT SYSTEM
VERIFICATION
210

CLIENT DEVICE
VERIFICATION
220

ACCOUNT NUMBER
LOOKUP
230

ACCOUNT VERIFICATION
240

FRAUD DETECTION
250

TOKENIZATION
260

INPUT/OUTPUT SYSTEMS
270

MERCHANT SETUP WITH
ACCOUNT SECURITY
ELEMENT
280

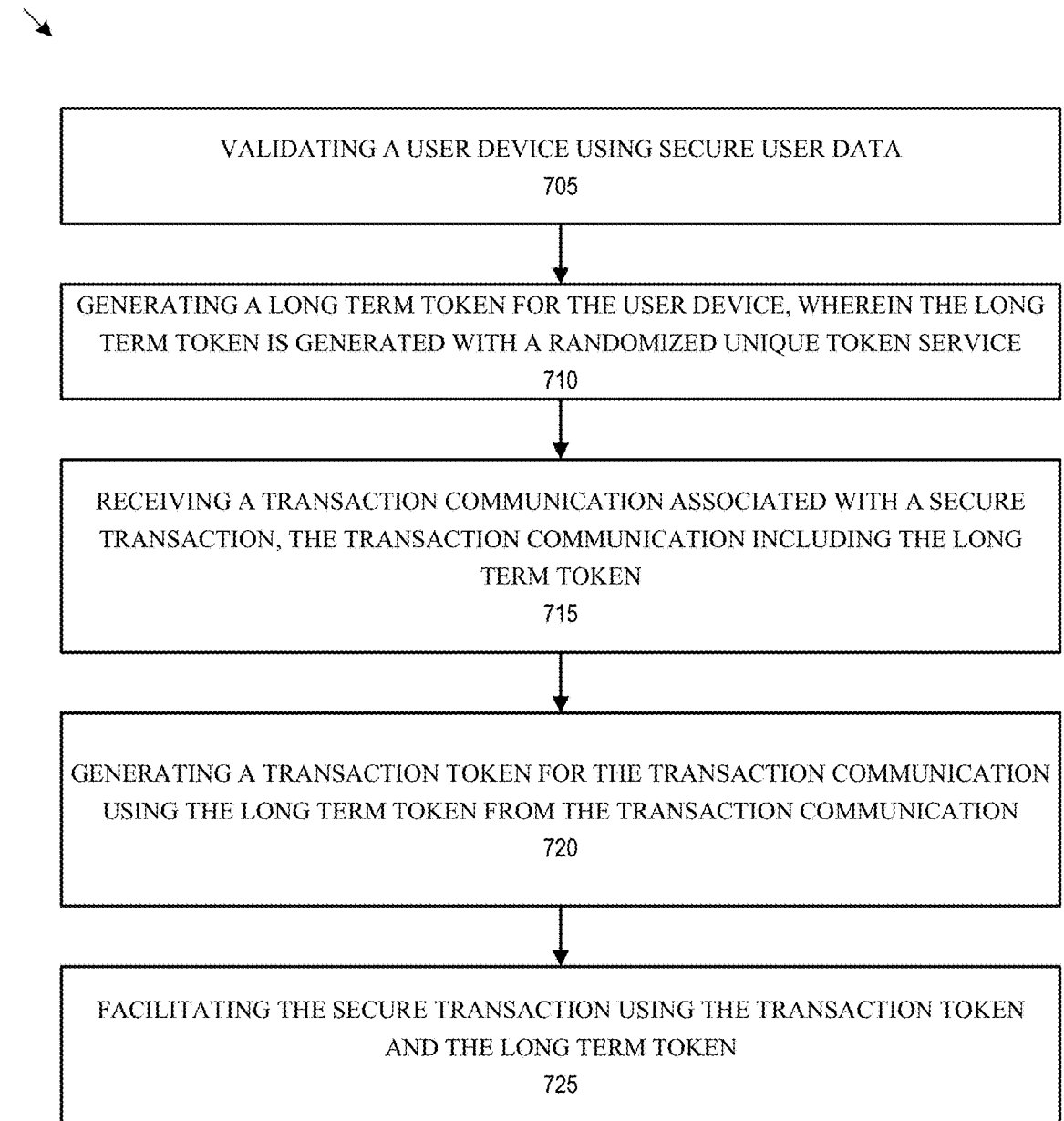

VALIDATING A USER DEVICE USING SECURE USER DATA
705

GENERATING A LONG TERM TOKEN FOR THE USER DEVICE, WHEREIN THE LONG TERM TOKEN IS GENERATED WITH A RANDOMIZED UNIQUE TOKEN SERVICE
710

RECEIVING A TRANSACTION COMMUNICATION ASSOCIATED WITH A SECURE TRANSACTION, THE TRANSACTION COMMUNICATION INCLUDING THE LONG TERM TOKEN
715

GENERATING A TRANSACTION TOKEN FOR THE TRANSACTION COMMUNICATION USING THE LONG TERM TOKEN FROM THE TRANSACTION COMMUNICATION
720

FACILITATING THE SECURE TRANSACTION USING THE TRANSACTION TOKEN AND THE LONG TERM TOKEN
725

FIGURE 7

MULTI-TIER TOKENIZATION WITH LONG TERM TOKEN

CROSS-REFERENCE TO RELATED APPLICATIONS

The present patent application is a continuation of U.S. patent application Ser. No. 17/732,009 filed Apr. 28, 2022, which claims the priority benefit of U.S. Provisional Patent Application 63/182,281 filed Apr. 30, 2021, the disclosures of which are incorporated by reference herein.

FIELD

The present disclosure relates generally to data security and transactions. In some examples, the systems and methods described herein may be used to implement data security and facilitate transaction authorizations using multiple unique random tokens, including on long term unique random token that is used to generate a single-use random token for a transaction.

BACKGROUND

Clients often seek to obtain and use credit from a lending institution for a variety of purposes. In some circumstances, a client may interact with a merchant in an environment where the client does not have access to the client's account number, or where the client prefers additional security and protection for the client's data. Additionally, in some circumstances, a client may interact with a single entity to make a single payment to multiple different merchants. Managing a transaction in such environments can create barriers to completing transactions between clients, merchants, and lenders. Additionally, other considerations can be involved in such transactions, such as lender and merchant concerns related to fraud, and regulatory controls on data sharing when the data used in such transactions can be subject to a variety of privacy and regulatory considerations. Similarly, clients can seek to reverse transactions in a variety of contexts allowed based on the agreement between a client and a merchant that use a transaction network. Such considerations in both the context of the transaction and the transaction reversal can further create barriers in the context of network communications and data management in a communication system.

SUMMARY

Disclosed examples may provide systems for enhanced security in transactions by using a multi-tier tokenization system with a long term token. A long term token can be a unique random token that can be used multiple times in conjunction with additional unique random tokens for security. The use of a long-term (e.g., multiple-use over time) token in addition to other tiers of tokens, such as a single transaction token, can enhance security in the context of the described systems. This can include systems to standardize merchant and user authentication for secure transactions and transaction reversals (e.g. refunds) for the transaction. Examples include a framework to implement data security for client data used as part of a network transaction. In this data security context, sensitive client information, such as an account number, can be kept from the merchant system (e.g. using tokenization). Similarly, use of a long term token can add additional security for a user to access one-time tokens for transactions, or other such tokens. In such a context, when a customer reverses a transaction, the merchant only has access to a tokenized client account number or any tokenized account number. An account security system can be used to facilitate the transaction reversal while still maintaining a separation between the merchant system and the sensitive client information. Similarly, use of a long term randomized token that is updated periodically can prevent malicious actors from generating tokens on behalf of a user, providing additional security for both transactions and transaction reversals. Such security features improve the operation of a communication system and devices in the communication system by enabling additional functionality with similar computing resources in addition to the improved security.

Examples allow organizations to provide efficient transactions in a secure network. Additional examples or variations can include further security operations to confirm the security of a client device, and to enable interactions with other systems as part of a secure transaction. The examples described above improve the operation of transaction communications systems and devices in such communication systems by improving device security and security of sensitive data within such devices and systems. Additionally, interfaces described herein improve both the operation of devices displaying such interfaces and communication systems used by such devices by improving the operation flow and reducing the number of user actions to perform operations as part of a secure transaction, as well as by enabling new functionality in system devices.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

The present disclosure is described in conjunction with the appended figures:

FIG. 2 depicts aspects of an account security system for implementing data security and transaction management in accordance with some examples.

FIG. 7 is a flow diagram illustrating a method in accordance with some examples.

Figure 1:
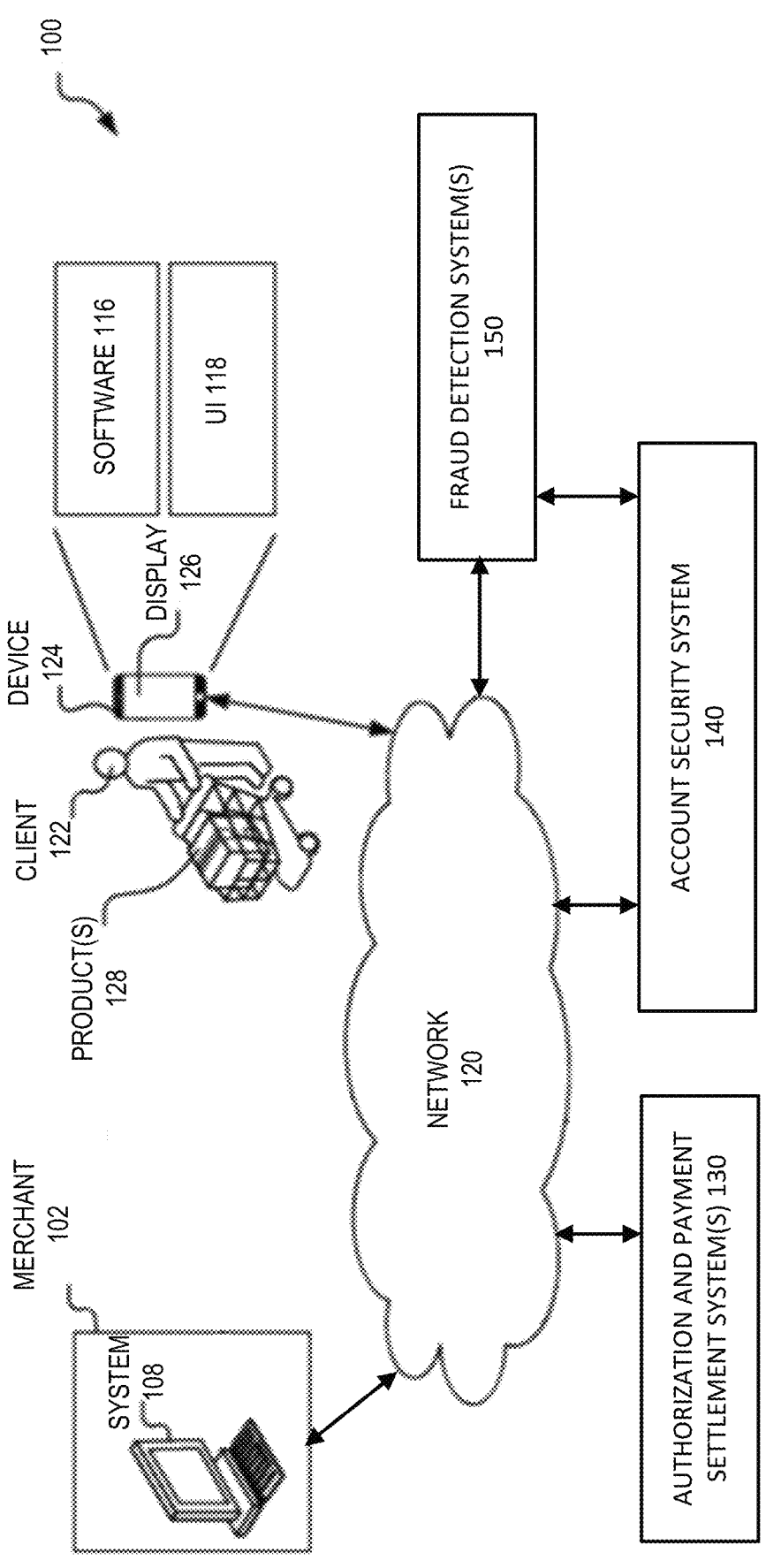
FIG. 1 depicts aspects of a system that can be used for data security and transaction management with a multi-tier tokenization system and a long term token in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

In some transaction environments, in order to keep sensitive client data separate from merchant systems, aspects of a transaction system (e.g. a merchant website) can be structured using separate account security systems. Such structures can implement data security for a transaction using a tokenized account number to keep sensitive client data separate from merchant system. Such a tokenized account number prevents a merchant from independently refunding an account without the merchant having access to the account security system, since the merchant does not independently have the information to match the tokenized client account number to the actual account. While the use of a unique token for an associated transaction provides security features, the systems for accessing and generating a unique token for a transaction include vulnerabilities. For example, a user may have sensitive information (e.g., personal questions, identifying information, or other such data) that is used to generate the one-time token for a particular transaction. Examples described herein use a multi-tier tokenization system, with a long term token that can be used for an added level of security. The long term token can include some features of a single use token, such as being unique within a system. While the long term token can be used repeatedly, after an expiration trigger occurs, a further attempt to use the long term token will trigger a security event. A user associated with the long term token will receive a new unique random long term token after the expiration trigger. The long term token can act as a security feature for generating transaction specific unique tokens, or other unique tokens in a secure transaction system. Use of multiple tiers of random tokens can provide additional security and anonymity in a secure transaction environment. For example, a long term token can act as a tokenized account number can be used by the account security system to identify an account associated with a transaction, and a transaction specific unique token can be used to identify the transaction separately from the tokenized account number Such improvements, can, in some examples, operate in a modular website environment. This modular function can be implemented with a checkout button associated with an account security system to be added to a website. This button allows an interface for account lookup and verification to facilitate custom payment solutions selected by a merchant. The button is provided to client devices as part of a web page user interface from a merchant system. When a client interacting with a merchant website clicks the described modular button, various operations for account security are initiated. The merchant system responds to this selection by communicating with an account security system to authenticate the merchant system. The account security system can then return a client token and postback identifier if the merchant is authenticated. In some examples, and such tokens or identifiers can be structured as a tier of randomized tokenization in a multi-tier tokenization system.

Additionally, other examples can add additional security operations, or can perform different operations for any number of accounts associated with clients. As the account security system is modular and independent of other operations for a secure transaction, after the account validation is performed and the tokenized client data is generated, the merchant device can interact with separate independent systems to finalize and settle the secure transaction. In various examples, the account security system may communicate with such independent systems to facilitate the use of the tokenized data. The authentication tokens and the tokenized client data can then be used in transactions and transaction reversal operations. Details of selected examples are below, though it will be apparent that additional implementations are possible other than the specific examples provided.

FIG. 1 is a block diagram of a payment communication network 100 in which network data management and security for transactions is implemented using multi-tier tokenization with a long term token in accordance with some examples. The example payment communication network 100 includes a merchant 102 implementing a merchant system 108, which can be one or more networked computing devices that can be networked. Merchant system 108 can include any number of devices (e.g. a checkout register, point of sale (POS) devices, or any other such device) as well as server systems and computers that implement a website that can be used to perform secure transactions over a network 120. The merchant system 108 and associated website can be implemented as a computing device with architecture 800 described below and illustrated in FIG. 8.

Referring to FIG. 1, the merchant system 108 is configured to perform operations associated with a purchase transaction for a client 122 and a product 128. In some examples, a client can use a client device 124 (e.g., a cellular telephone, laptop computer, a desktop computer, etc.) associated with a client account to interact with merchant system 108 as part of a secure transaction. Some examples of a client device 124 can include a display device 126 (e.g., a conventional touch screen) and wireless or wired network connections to network 120. The client device 124 includes software 116 that can additionally cause display of user interfaces 118 on display device 126 in accordance with various examples. This can include, as described herein, web browser software as part of software 116 that can display a user interface using data received from a website of merchant system 108.

A client 122 may select one or more products 128 for purchase via interface(s) of the merchant's website. When the client device 124 interacts with the merchant system 108 via a website interface, the merchant system 108 can use a payment channel based on the particular client device 124 and options selected by client 122.

The merchant system 108 generates and communicates an authorization request message with authorization and payment settlement system(s) 130 as part of a secure transaction. The authorization request message can be routed to an authorization system, with the authorization system 130 processing the authorization request message to generate an authorization response.

An authorization entity can operate one or more authorization computing devices as part of an authorization system 130 configured as part of a payment communication network 100. The authorization system 130 can include various sub-systems or component functions implemented on processors of the authorization system to enable authorization of payment transactions between client 122 and merchant 102. The authorization system 130 can include validation and fraud systems as well as a promotion system. These systems can be systems that operate in addition to similar systems of account security system 140 or independent fraud detection system 150. Validation and fraud systems of system 130 can include computing systems for validating card numbers from client device 124 to confirm that credit or payment funds are available to match the purchase amount associated with a transaction being authorized. Additional fraud analysis operations can analyze and process information associated with any aspect of a transaction to approve or deny an authorization request.

In addition to the systems described above, an authorization system can in various implementations, include additional systems for security, fraud detection, and other functionalities. Some implementations can include a token system or service that can act in a number of ways to facilitate secure communications between client 122 and various other services and devices, including retail merchant system 108 and other systems. Tokenization is a process of substituting sensitive data elements with non-sensitive equivalents (e.g. tokens). The token is a reference identifier that can be mapped to the sensitive data via token service. Such a token service can use large random number in combination with other systems, such as timing systems, to limit and secure the use of sensitive data being communicated over networks such as networks 120.

As described above, in some examples, authorization system 130 can be integrated with other systems, such as a credit issuing system and communication channels with a client 122 outside the authorization channels used to communicate authorization request messages and responses between merchant devices and devices of an authorization system (e.g. authorization system 130). In such a system various additional functionality can be integrated for security and payment systems improvements, such as the use of token services as described above. Additionally, while FIG. 1 illustrates communications between various systems and devices, including merchant system 108, client device 124, authorization system 130, account security system 140, fraud detection system 150, and network 120, in additional examples, other aspects of payment communication network 100 can further be altered or include additional or intervening elements, such as multiple clients, clients with shared accounts and devices, additional merchant or retailer systems, subsystems that can operate independently, additional communication channels, or other such structures.

Fraud detection system(s) 150 can include any independent service or system that can be used by account security system 140 or authorization system 130 to supplement or support fraud or security systems. For example, fraud detection system 150 can include systems for detecting if a computer of merchant system 108 or a user device 124 has been compromised by malicious software or other security risks. Fraud detection as described herein can include the use of independent data identifying such issues, as well as communications and analysis operations performed with such devices before they are allowed to participate in secure transactions with account security system 140 and/or authorization system 130. Additional examples can include other such security and fraud detection schemes to support the implementation of secure transactions as described herein. Additional details of an account security system 140 are described below, and in various examples, fraud detection system(s) 150 can be implemented with varying degrees of integration with an account security system 140.

FIG. 2 depicts aspects of an example account security system 140, which can be used within a payment communication network 100 or other systems to implement data security as described herein. Account security system includes a number of different elements that can be implemented as modules or different devices networked to implement various security functions. Account security system can be implemented as a single server, or as a distributed system using multiple networked devices. Input/output systems 270 can manage transmission of data and receipt of data both between different elements of the system 140 as well as with other devices, such as merchant servers and client devices, using any suitable network and communication components, such as those described below with respect to FIG. 8. The described elements of account security system 140 include merchant system verification 210, client device verification 220, account number lookup 230, account verification, fraud detection 250, and input/output systems 270. In other examples, these elements can be grouped in a variety of different ways. For example, client device verification 220 and fraud detection 250 can, in some examples, be structured as a single sub-system, or can be largely implemented as a separate system (e.g. using separate fraud detection system(s) 150). In various examples described below, the elements of account security system perform different parts of the operations to implement security as part of a secure transaction that uses modular elements to add to the security of larger systems.

Merchant system verification 210 interacts with merchant systems such as merchant system 108 to authenticate that the merchant is safe for a user to perform a transaction with. This verification can be done using security measures such as using security keys, transaction history data, merchant registration, and other verification tools. Merchant system verification 210 can create tokens that can be used as part of a secure transaction to allow participants in the transaction to confirm that they are interacting with verified participants that have met security standards and have access to the token generated by merchant system verification 210 for a specific transaction.

Client device verification 220 can include security operations to check for issues with a client's device, such as malicious software installed on a client device, a history of questionable transactions or fraud associated with a specific device, or other operations. This verification can be implemented via communication with a specific client device, accessing database data with fraud history data, or requiring installation of software on a client device to check for security issues with a client device. In some examples, merchant system verification 210 operations and client device verification 220 operations can be used as gateways for additional sub-systems, such that merchant systems and client devices are not allowed access or use of additional systems such as account number lookup 230 and account verification 240 unless the threshold requirements of merchant system verification 210 and client device verification 220 have been met.

Account number lookup 230 and account verification 240 interact with client devices to receive client data and access sensitive client account information. These operations can, for example, include receiving information such as an address, phone number, government identifier, or other such information, and using this information to access an account number associated with a client credit account. The client credit account number can then be provided to the client device or tokenization 260 element with an authorization to use the credit account with a specific secure transaction (e.g. a transaction associated with a client token generated by merchant system verification 210.) Similarly, account verification 240 can accept a client account number associated with the client credit account, and provide information such as an available balance to allow a client to confirm that the available balance is sufficient for a current secure transaction. The operations of account verification 240 and account number lookup 230 can be associated with a particular transaction, and used to trigger generation of tokenized client data by tokenization 260 element. The tokenization can involve generation of a one-time set of data that can be used only for a specific transaction. In some examples, after the tokenized client data is generated in response to account security system interacting with a client device, the tokenized client data is then stored until it is requested by the merchant system associated with the secure transaction, or until a deletion event occurs. Such deletion events can include a threshold amount of time, a number of incorrect requests for data associated with the client device or the client account, or other such events. If a deletion event occurs, a subsequent request for the data by the verified merchant can be met with a response indicating that the data has expired and the secure transaction is to be restarted (e.g. a new secure transaction initiated and the original transaction abandoned.)

As described herein, tokenization 260 can manage multiple tiers of tokens, including a long term token. In some examples, such a long term token is generated using the same randomization operations as for a one-time use token, including the use of token generation mechanisms to verify that the token is not reused in the system. When any token is generated, a database can store the token to confirm that the token has been used, and to act as a check against the same token being generated twice in the system implementing tokenization 260. A single use transaction token can have an associated flag attached in the database that identifies the token as associated with a specific transaction. A long term token can, by contrast, have a flag or trigger associated indicating a use for the token, and an expiration. Checks against any token in tokenization 260 can verify the application and use for a particular token, and whether the use has expired. For example, when a token is received at account security system 140, tokenization 260 can check the token against a token database to confirm if the token has been generated by the system. If not, the token is rejected for all purposes, since only tokens generated by the system can be validated for security purposes. If so, the use of the token is identified. If the token is a long term token, an expiration check can be performed to see if the token is still valid. If the token is a single use transaction token, a check can be performed to see if the transaction is still in progress, or if a valid operation associated with the transaction (e.g., a refund) is in process. In other examples, other uses can be flagged by a system, or other triggers, depending on the design of different tokenization tiers (e.g., a long term token tier and a one-time use tier) in a system. Additional details of tokenization use are described below for a multi-tier tokenization system with a long term token.

Merchant setup with account security element 280 refers to systems used to integrate account security system 140 with associated merchant systems. The setup can include data intake and reporting systems, systems for confirming a particular website meets any limitations or technical requirements for accessing and integrating an account security system 140, and customization of an account security element to be used by a particular merchant website. The setup can additional include information about the tiers of tokenization used by account security system 140, and the appropriate signaling formats for using the appropriate tokenization tier when a merchant system communicates with account security system.

Throughout operations for data security described herein, fraud detection 250 can monitor data and generate alerts or halt operations for a specific transaction when a risk of fraud is identified.

Figure 3:
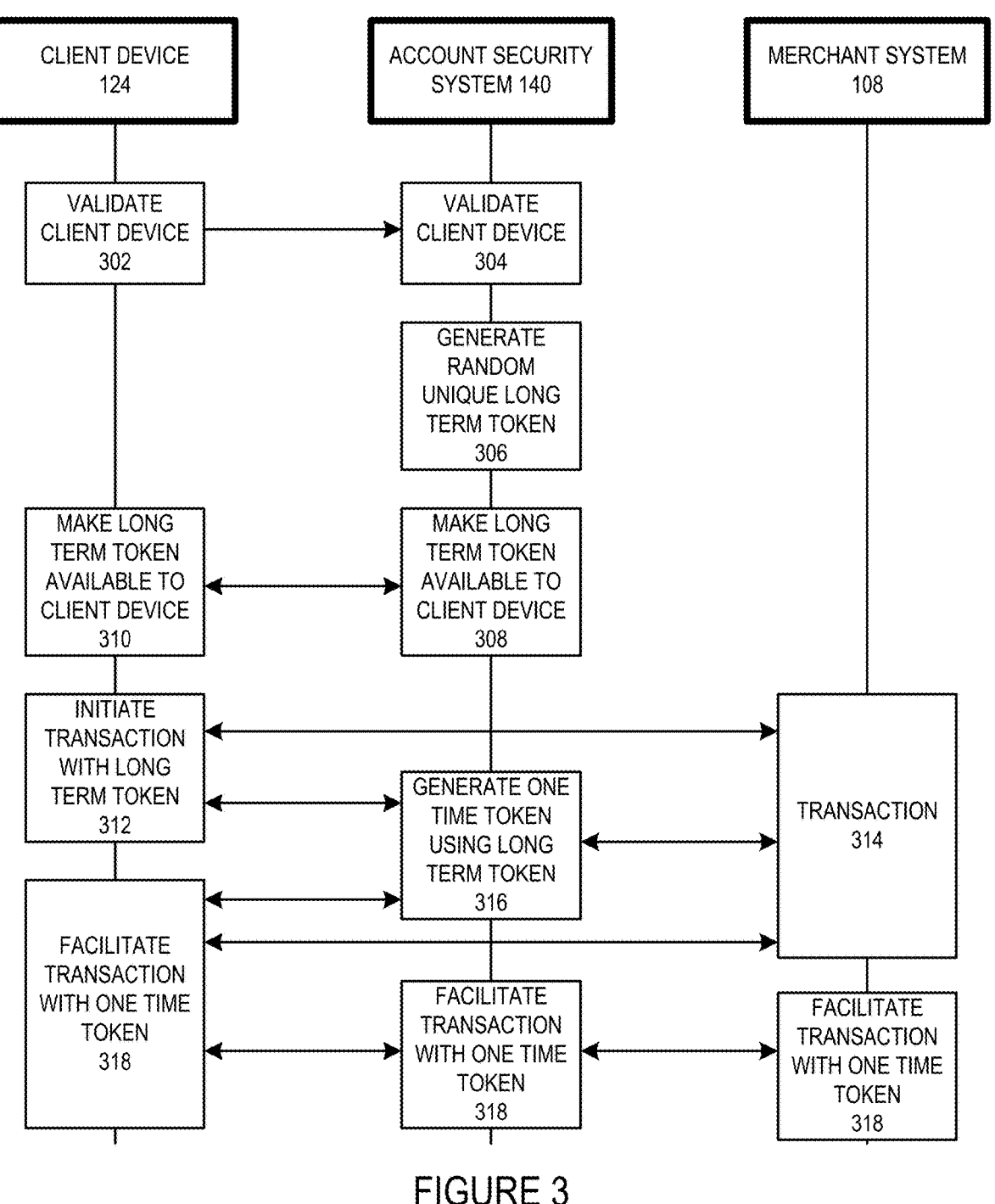
FIG. 3 depicts aspects of a system and system operations for data security and transaction management in accordance with some examples.

FIG. 3 illustrates system operations and communications for data security with multi-tier tokenization involving client device 124, account security system 140, and merchant system 108. As illustrated, client device 124 initially interacts with account security system 140 to generate a long term token. This involves operations 302 and 304 to validate the client device. Such validation can include registering sensitive data associated with a client and client device 124 with account security system 140. The sensitive client data can be used to establish an account and initial security for the client associated with client device 124 to onboard into a multi-tier tokenization system. After client device 124 is validated with account security system 140, the tokenization system (e.g., tokenization 260) generates a long term token for client device 124 in operation 306, any criteria for triggering an expiration are established. The limits of the long term token can include a variety of different expiration triggers, including a time trigger, a number of verifications, a security alert associated with possible security risks, or any combinations of such limits or other limits. Such limits or triggers can be stored in a database of generated tokens at account security system as part of operations 306. The long term token is then made available to client device 124 in operations 308 and 310. The operations 308 and 310 can include communicating not only the token, but information on token limits. For example, if a time limit is established for the long term token (e.g., two weeks, two months, one year, etc.), this information can be communicated to client device 124 with information on replacing the long term token following the expiration time. Similarly, another such expiration triggers can be communicated with information on replacing the long term token following an expiration trigger.

Following operations 310, client device has a copy of the long term token which can then be used as one tier of a multi-tier tokenization system. The long term token can, in some examples, be used in secure transactions to generate a one-time token. For example, as illustrated, in operations 312 the long term token can be used as a secure identifier to initiate a transaction. Such operations can occur as part of a checkout through a merchant website to purchase items selected through the merchant website, or can occur through a redirect or independent security system of account security system 140 configured to interact with merchant system 108 as part of a transaction.

The transaction initiation can either be done by providing the long term token to merchant system 108 as part of transaction operations 314, or by requesting a one-time token using the long term token in operations 316. In either case, the long term token is provided to account security system 140, which uses the long term token as a security check in generating a one-time token for the transaction of operations 312, 314, and 318. In some implementations, the format of the one-time token is the same as the format of the long term token (e.g., a same number of digits, characters, etc.). In other examples, the one-time token has a different format than the one-time token (e.g., a long term token with fewer digits or characters associated with the lower turnover and expected number of unique variations for the different token types). In one example of a shared token format, a set of shared identifying characters are used, and a set of randomized numbers are used to create unique variations on the shared token format.

In addition to the two token example above, additional examples can have additional random tokens. For example, an account, a device, a transaction, a merchant system, or other elements associated with a client and a transaction can have unique assigned tokens. In any case, any token generated by account security system 140 is stored for use in verifying that the token use rules (e.g., long term with a trigger, one-time use, etc.) are followed as a security measure.

After the one-time token is generated in operation 316, the one-time token is used in operations 316 and 318 to facilitate the transaction with the one-time token. The facilitation can include authentication and authorization operations, as well as operations to store the one-time token for any possible refund or transaction reversal, or any other such operations as part of a secure transaction.

In some examples, a checkout communication as part of transaction operations 314 and 318, account security system 140 authenticates merchant system 108 to confirm that the merchant system is secure and has been validated. As described above, in some examples the merchant authentication can be done with one or more tokens for merchant system 108, which are different than the tokens associated with client device 124 discussed above. Just as with the different tokens (e.g., one-time and long term) for the client device, the merchant tokens can share a format with the client tokens that is managed by a record or database as part of account security system 140. In some examples, the account security system generates a client token when the authentication is confirmed, and communicates the client token to merchant system 108. In some examples, the client token can be communicated with a postback identifier to allow tracking of the communications for the secure transaction, and to allow management of different transactions with different client devices and merchant systems that can continuously be interacting with account security system 140 to provide data security for secure transactions. Such communications can additionally combine the unique randomized tokens provided by tokenization elements of account security system 140. The various secure tokens allow both client device 124 and merchant system 108 to confirm transaction security at multiple levels.

Figure 4:
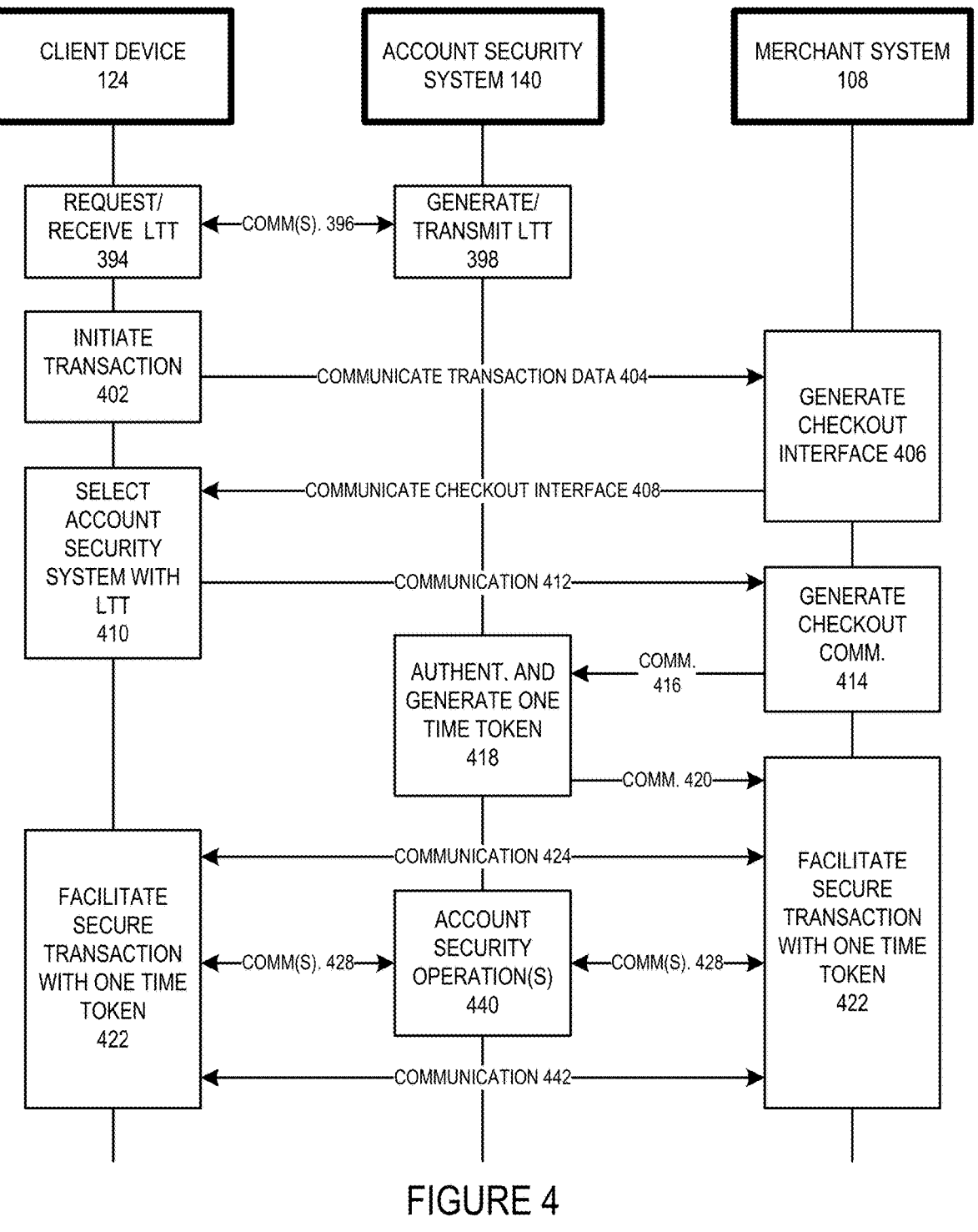
FIG. 4 depicts aspects of a system and system operations for data security and transaction management in accordance with some examples.

FIG. 4 depicts aspects of a system and system operations for data security and transaction management in accordance with some examples. Just as above in FIG. 3, FIG. 4 includes client device 124, account security system 140, and merchant system 108. FIG. 3 illustrates the initial registration of a long term token for client device 124 with a high level description of using the long term token to request a single use token. FIG. 4 illustrates a specific implementation of a system for generating a single use token with a long term token, by routing the long term token through merchant system 108 to have the merchant system communicate with account security system 140 using the long term token for client device 124 to generate the one-time token.

The described operations of FIG. 4 begin with a request and receipt of a long term token by client device 124 in operations 394, along with the associated communications 396 and long term token generation and transmission operations 398 by account security system 140. In the example of FIG. 4, client device 124 interacts with merchant system 108 as part of a secure transaction in operations 402, 406, and communications 404. Such transaction operations can include website communications, operations to select services or items, or other such aspects of a network transaction. As part of the transaction, as client device 124 finalizes the transaction details, merchant system 108 generates a checkout interface as part of operations 406 and communicates the checkout interface to client device 124 in communication 408. The checkout interface can include an interface element associated with account security system 140 to facilitate a secure transaction with a multi-tier tokenization system. In operation 410, client device 124 receives an input (e.g., a user interface selection) associated with the long term token and account security system 140, and the long term token is sent to merchant system 108 in communication 412. Merchant system 108 uses the long term token to generate a checkout communication in operation 414, and sends the checkout communication including the long term token, to account security system in communication 416. The account security system 140 then authenticates the merchant and the client device in operations 418, with the client device authentication using the long term token. If the authentication of both client device 124 and merchant system 108 is successful, the account security system 140 generates a one-time token for the secure transaction, and communicates the one-time token to merchant system 108 in communication 420.

FIG. 4 particularly describes a system where the merchant system 108 is configured to manage interactions with account security system 140 so that the single use token is communicated to merchant system 108 from account security system 140, without account security system 140 sending the one-time token directly to client device 124. In other examples, account security system 140 can communicate the one-time token directly to client device 124 and not merchant system 108, or both. Communications 424, 428, and 442 can be used for such interactions between client device 124, account security system 140, and merchant system 108. In one example, a device (e.g., client device 124 or merchant system 108) that does not receive the one-time token directly from account security system 140 can receive a copy of the one-time token indirectly (e.g., client device 124 receiving a one-time token generated by account security system 140 via merchant system 108), and can then verify the authenticity of the indirectly received one-time token in a direct communication with account security system 140. Such operations can be part of account security operations 440 and communications 428.

In FIG. 4, after communication 420 sends the one-time token to merchant system 108, operations 422 facilitate the secure transaction. The secure transaction facilitation can include confirmation details regarding the use of the one-time token, verification of the transaction details (e.g., items, service agreements, payment amounts, etc.) as well as additional security operations managed by any participant in the secure transaction as part of security operations 440 and communications 428. The security operations 440 can include third party checks for security flags, such as checking details of client device 124 against a database of security risks, or other such security operations. After the secure transaction is authorized and finalized, the operations can further continue with settlement operations, or may result in transaction reversal operations as described further below.

In examples described here, the use of account security system 140 in addition to authorization and payment settlement system 130 provides benefits to a system in which merchant system 108 and system 130 have fixed structures or implementations that would require significant resources or changes to implement the account lookup and account verification features between merchant system 108 and system 130. The use of account security system 140 enables such functionality with minor modular user interface changes by merchant system 108 website implementations, so that the security of the system 130 and merchant system 108 communications is improved without these systems needing to be replaced.

The isolation described above to keep merchant system 108 from storing sensitive client information, such as an account number, extends to transaction reversal (e.g. refund) systems. In the above described system, if a client requests a refund for a transaction, the merchant system will not have a record of the account number for an account that a refund will be settled to. Because of this, a client is not able, in such systems, to use an account number in requesting a refund or in such related operations. Instead, other information, can be used to identify the transaction. As described above, since the tokenized account number can, in some systems, be unique to a specific transaction, the tokenized account number can be used in such systems to identify the transaction when a refund is requested. In other examples, other information, such as a combination of one or more data elements including a channel identifier, a transaction identifier, a merchant number, a promotion code, a transaction amount, a transaction description, a security code, an expiration, an address, and a partner code, can be used in identifying a specific transaction. Depending on the particular account security structures, sensitive client data (e.g. as defined by a particular system) is excluded from this data, as the merchant will not have access to this information in identifying a transaction. The information the merchant does have (e.g. data that is not considered sensitive client data) can be used in performing transaction reversal operations as described in more detail below.

Figure 5:
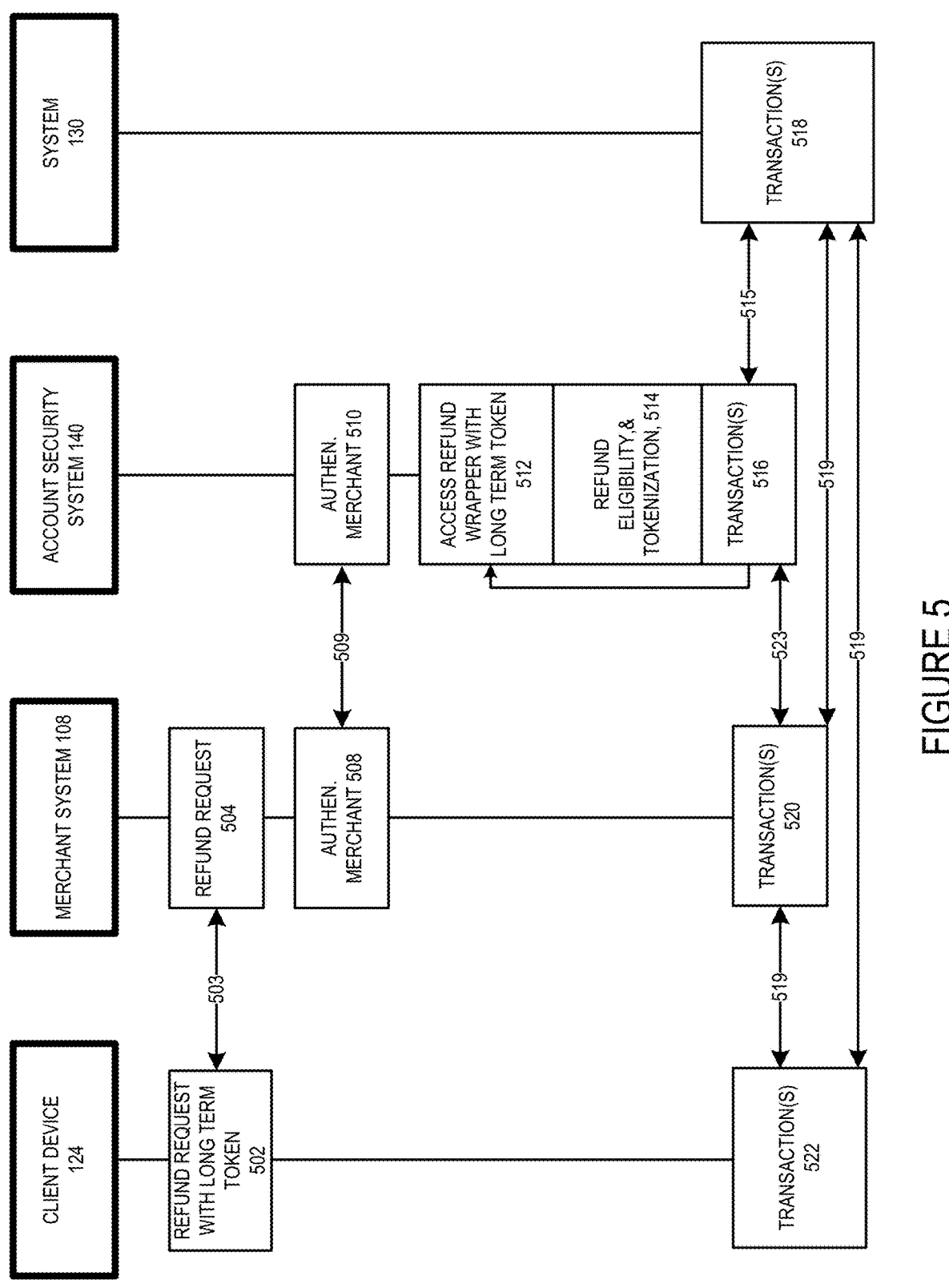
FIG. 5 depicts aspects of a system and system operations for data security and transaction reversal management in accordance with some examples.

FIG. 5 then depicts aspects of a system and system operations for data security and transaction reversal management in accordance with some examples. In FIG. 5, secure transaction reversal (e.g. refund) operations are described involving client device 124, account security system 140, and merchant system 108. This can be the same system used above in FIG. 3 or 4, and so the integration of account security system 140 into transactions involving merchant system 108 and customers of merchant system 108 can also involve configuring a refund system so that merchant authentication structures (e.g. merchant identifiers, passwords, secure communication procedures, etc.) can be used for transaction reversal operations as well as the initial transaction. This allows for a seamless and efficient merchant integration of refund operations with security systems used to secure client data as part of a communication network for secure transactions. Systems to manage this integration between account security system 140 and merchant system 108 can be structured as described above (e.g. as a merchant setup with an account security element for onboarding any merchant system with account security system 140).

Prior to operation 502, the merchant system 108 is on boarded with account security system 140, and the merchant website integrates account security elements from the account security system 140. Just as for the initial transaction, this can include integration for a refund request, such as including a refund security element.

In operation 502, a user of client device 124 initiates a refund request using a long term token. The long term token can be the same token used for a transaction, or can be an updated token that replaced a previous long term token based on an expiration trigger, as described above. As part of the refund request operations 502, the client device 124 will interaction with merchant system 108 in communications 503 to identify the previous secure transaction that the refund (e.g. reversal) is being request for. The corresponding refund request operation 504 at merchant system 108 can request additional information from client device 124, or can access a local database for additional information related to the secure transaction. Communications 503 can thus include back and forth communications between client device 124 and merchant system 108. These communications can confirm the refund, notify client device 124 of details of the reversal, including any terms or limitations associated with the reversal, such as the loss of promotions associated with the secure transaction, or other such information. Once the refund request operations are finalized, the merchant system 108 then proceeds to initiate the refund through account security system 140 for refunds to be settled using system 130.

As part of the refund initiation following the initiating refund request operations 502 and 504, the merchant system 108 is authenticated with account security system 140 in merchant authentication operations 508 and 510 using communications 509. The authentication operations can use the same systems for authentication used in the initial transaction (e.g. as illustrated by FIG. 3 or 4), such as a merchant identifier and merchant password. The authentication and communications 509 with account security system 140 can additionally use the long term token received in communications 503 to indicate to account security system 140 that client device 124 and an associated client or client accounts, are involved in the transaction reversal. In various implementations, any additional layers of security and authentication can be performed as part of or in addition to the described merchant authentication. The additional security can include security checks using the long term token associated with client device 124 to check for indicators that client device 124 has been compromised or is being spoofed. The additional security can also include secondary checks to indicate tiers of security, such as refund history, recent account activity, multi-factor authentication for either a client or merchant based on history data or machine learning patterns for loss prevention, or other such systems.

When the merchant authentication operations 508 and 510 are complete, the account security system 140 processes data from the refund request and any associated information from client device 124 and merchant system 140 in processing the refund wrapper in operation 512. In some examples, a refund request can aggregate multiple refund requests for multiple transactions, resulting in an automatic looped process relying on a single merchant authentication. In other examples, only a single transaction is processed at a time. For each individual transaction, within the aggregated set, the refund processing steps are performed automatically without individual authentication, since each individual refund process is performed under the shared authentication. For each refund, these automatic operations can include an eligibility check, any associated tokenization for the transaction managed to identify the actual account associated with payment and settlement, and additional security and process checks performed with the actual account number in refund eligibility and tokenization operations 514.

Following the processing and security checks of the above operations, account security system 140 then communicates with system 130 with communications 515 to initiate settlement and refund of the payment for the secure transaction in transaction operations 516 and 518. This includes communications which comprise the account number for the client account used to make the payment. System 130 can then manage the refund with merchant account(s) and client account(s) to detect any appropriate amount from the merchant accounts and return any appropriate amount to the client accounts. In some systems, the transaction operations 518, 520, and 522 and associated communications 519 can be integrated with dispute resolution operations, confirmation data associated with a refund and eligibility criteria, or other such operations. This can include status check communications 523 for a merchant system 108 to check a refund status with account security system 140 as part of transaction operations 516. In such a system, the account security system is used to initiate the refund procedures with system 130 when a tokenized account number is used for a secure transaction, and detailed refund verification, transaction disputes associated with a refund request, and final decisions on settling disputed aspects of a transaction and transaction reversal are handled via system 130 communicating with merchant system 108 and client device 124, or other devices associated with a user of an account involved in a transaction and the merchant associated with the transaction. The system 130 can communicate with merchant system 108 using refund identifiers, the tokenized account number used for the secure transaction, or other identifiers while maintaining the established data security to keep sensitive client data isolated from merchant system 108.

At any time following transaction operations 516, account security system 140 can inform merchant system 108 of a status of transaction operations 516 in communication 523 to let merchant system 108 know that the appropriate account and transaction refund information has been communicated to system 130 for system 130 to perform settlement transactions with the parties. In some systems, such communications 523 can be performed automatically in response to account security system 140 completing a loop of refund processing operations for a refund wrapper of a refund request communication, or can be performed automatically based on a timed communication schedule managed by merchant system 108.

Figure 6:
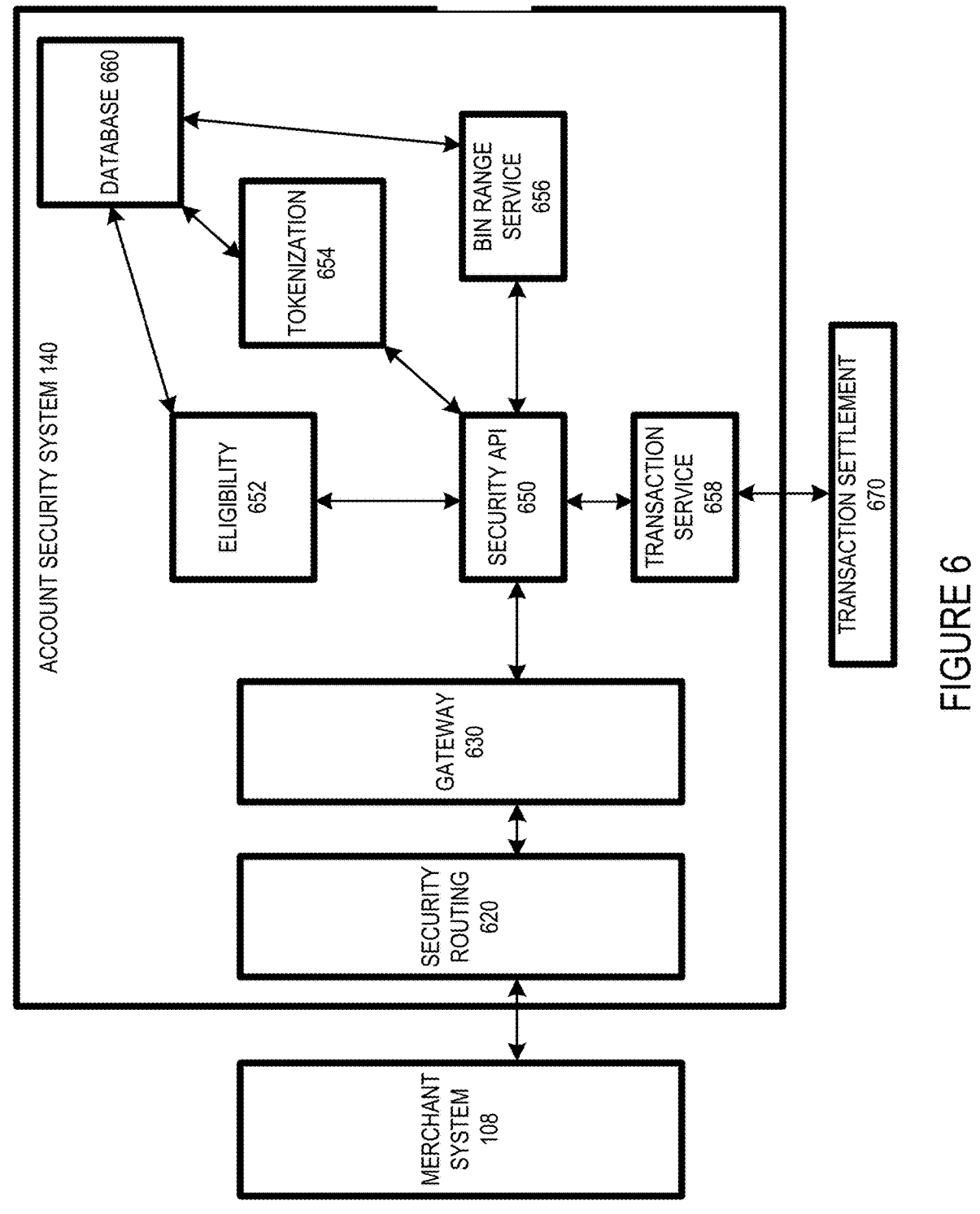
FIG. 6 depicts aspects of a system and system operations for data security and transaction management in accordance with some examples.

FIG. 6 then illustrates aspects of an example account security system 140 for processing refund data as part of account security for a secure transaction reversal. FIG. 6 includes a merchant system 108 interacting with aspects of an account security system 140 for refund processing. As illustrated by FIG. 6, merchant system 108 communicates with account security system 140 via multiple security layers, shown as security routing 620 and gateway 630. The security routing system can be an integrated network or a third party network for managing communications and routing those communications to secure servers that store sensitive client information. The gateway 630 system can be a third part system that implements systems for filtering improper communications and denial of service attacks. The filtering can include initial formatting checks on incoming data or other such initial security checks. The security checks can also include checking incoming traffic against previous communications or known communication sources that are unlikely to be sources of client data. These routing, proxy validation, and data validation systems can, in some implementations, be integrated with the other elements of account security system 140, or in other implementations, can be implemented separately or as third party services integrated with account security system 140.

After data for a valid refund request makes it through security routing 620 and gateway 630, a refund application programming interface (API) 650 service manages account security system 140 operations to enable the desired transaction settlement 670 operations. In some examples, the transaction settlement 670 operations are performed by or in conjunction with a separate settlement system 130 as described above in FIG. 5. The example account security system routes the refund request from merchant system 108 through a series of systems prior to the request proceeding to transaction settlement 670 operations. Throughout these operations, at least one database 660 is used to check data associated with the requested refund. The database can be a secure database integrated not only with the illustrated elements of account security system 140, but with additional elements such as any element of FIG. 2. Database 660 can thus store information for merchant identifiers, merchant passcodes, merchant procedures and data checks for operations such as transaction refunds, tokenization data, account numbers and ranges, and other such data.

As an initial operation, the refund API 650 is used for eligibility 652 checks for a refund. This can include confirming merchant enrollment in refund systems through account security system 140. This can also further include status checks on data supporting refund operations for a particular merchant system, including merchant system 108. If the valid refund request is determined by eligibility 652 system to not be eligible, the refund request is rejected and a communication can be sent to merchant system 108 providing a reason for the rejection. The communication can include a promotion with a no-refund element. The communication can include an expired time limit for refund requests. The communication can include an issue with data in database 660 not identifying the particular transaction data provided by merchant system 108 as associated with a transaction or as associated with a transaction that is eligible for a refund. In some instances, the data issue can result from corrupted data (e.g. improper digits in a tokenized account number) or from a validly formatted request that does not include data that is found in database 660 (e.g. due to a malicious attack on the system using properly formatted data but not using valid data, or other such issues). Such issues can also include any other such rule violation associated with eligibility systems configured by a merchant system 108 or account manager for account security system 140 during onboarding configurations as described above.

When the refund request is determined by eligibility 652 to include information for an eligible transaction, tokenization 654 systems are used to match any tokenized account data to an actual account number stored in a database 660. The tokenization checks can include automatically accessing a table that stores tokens tokenized account numbers for transactions and clients to match the tokenized numbers to the actual numbers. The tokenization checks can also include checks against any token in a multi-tier tokenization system, including a long term token. Once the actual account number used for the transaction is identified, bank identification number (BIN) range service 656 systems are used to access any limits or operations for a particular BIN range, and additional security operations can be performed using the actual account number. This can include checking security breaches associated with an actual account number to confirm that the account number has not been compromised. This can also include any other such services associated with the account number that are not able to be performed without the account number (e.g. services not available using only tokenized data or other general non-sensitive client data). Once BIN range service 656 operations are complete, transaction service 658 initiates operations for the actual transaction settlement 670 operations. As described above, transaction settlement 670 operations can be performed by a system 130 or any other such system, and can further include any number of operations for settlement, including deductions from merchant accounts, transfers to client accounts, dispute settlement operations, data management for records, updates to shared data for account history and security data used to update security systems that analyze transaction data, or other such operations. Transaction service 658 systems can communicate with any such systems such as system 130 to provide the refund request data and any other data from database 660 as structured within refund operations for merchant system 108.

FIG. 7 is a flow diagram illustrating an example method 700. Method 700 can be performed by one or more processors of a server computer or server system as part of a merchant system interacting with an account security system (e.g. merchant system 108 interacting with account security system 140). Method 700 can, in some examples, be implemented as computer readable instructions that, when executed by processing circuitry of a device, cause the device to perform steps of method 700.

Method 700 includes operation 705 which involves validating a user device using secure user data. As described above, such validation can involve various security checks for the user device, including a secure device identifier associated with characteristics of the device, a user passcode, a user identifier, or combinations of such data. In some implementations, the validation can include a multi-step validation process, including validating the system performing the method 700 to the user device in addition to the user device validating itself to the system.

Method 700 further includes operation 710, which involves generating a long term token for the user device. In some implementations, the long term token is generated with a randomized unique token system operating locally. In other aspects, a remote networked system or a third party system is used for token generation. The token generation system can not only generate the token, but can keep a record of the token generation for confirming that the token is unique, and preventing token duplication or errors associated with systems for confirming valid tokens.

Operation 715 of method 700 then involves receiving a transaction communication associated with a secure transaction, where the transaction communication includes the long term token. This can be a communication for any type of transaction, including secured communication verification when the user is authenticating the device to another device involved in the secured communication, a financial transaction, or any other such communication where the user device can use the long-term token for identification. As part of the long term token generation, one or more token expiration triggers can be created along with the long term token. For example, a 3-month expiration can be associated with the token, a threshold use expiration can be associated with the token (e.g., such that the long term token expires after a given number of uses), a validation expiration that requires a communication from the user device confirming that the user is continuing to use the long term token within a threshold period of time, or any combination of such token expiration triggers can be associated with the long term token at creation.

Operation 720 of method 700 involves generating a transaction token for the transaction communication using the long term token from the transaction communication. The transaction token, in contrast to the long term token, is valid only for the circumstances of an individual single interaction. This can be a single communication session, a single financial transaction, or other such limited purposes. Such limitations can be placed on the transaction token use similar to the limitations for the long term token, other than the number of uses. The transaction token can, for example, have a 15 minute expiration time or another such short term expiration associated with the limitation of the token to the single transaction.

In operation 725 of method 700, the secure transaction is facilitated using the transaction token and the long term token. Though as described above, the use of the transaction token is limited, records associated with the transaction token can be used for later verification of what happened in the transaction, to allow confirmation of details of the transaction. For example, while a transaction token can have a short term expiration (e.g., 5 minutes, one hour, 10 hours, one day, etc.), the token can be used, in some implementations, after the expiration to retrieve details of the transaction even after the use for authentication or other secure aspects of the transaction are complete and the token has expired for that purpose.

Some implementations of method 700 can further involve communicating the secure user data, wherein when the secure user data is received at a token system, the token system facilitates generation of the long term token.

Some implementations of method 700 can further operate where facilitating the secure transaction comprises: validating the long term token against an expiration threshold; and rejecting a transaction request when the transaction token is valid and unique, and the expiration threshold for the long term token is exceeded. Other implementations can operate where facilitating the secure transaction comprises: validating the transaction token against a used token database; rejecting a transaction request when the transaction token is identified as previously used by the used token database; and automatically updating an expiration threshold for the long term token to an expired status based on rejection of the transaction request.

In some aspects, method 700 can further involve performing real-time checks of long term tokens against associated expiration thresholds for the long term tokens; identifying the long term token as exceeding an associated expiration threshold; and automatically transmitting a long term token update communication. In other aspects, method 700 can involve transmitting the transaction token, wherein when the transaction token is received by a merchant system, the merchant system uses the transaction token as an account number to authorize and settle the secure transaction. In further aspects, method 700 can involve storing the transaction token in a used token database; updating the long term token with an updated long term token, wherein the long term token is updated based on an expiration trigger; and storing the long term token in the used token database, wherein the long term token in stored in the used token database based on the expiration trigger.

These operations can, in various examples, be integrated with other operations for account security and operation of an account security system as described herein. Complementary operations performed by devices in the same network as an account security system performing operations described herein are examples in the context of the described innovations. In some examples, operations described above can be repeated, can include intervening operations, or can be performed concurrently for any number of secure transactions between different merchant systems and client devices. It will therefore be apparent that while methods specifically described herein are example implementations, other implementations are also possible in accordance with the details provided herein.

Figure 8:
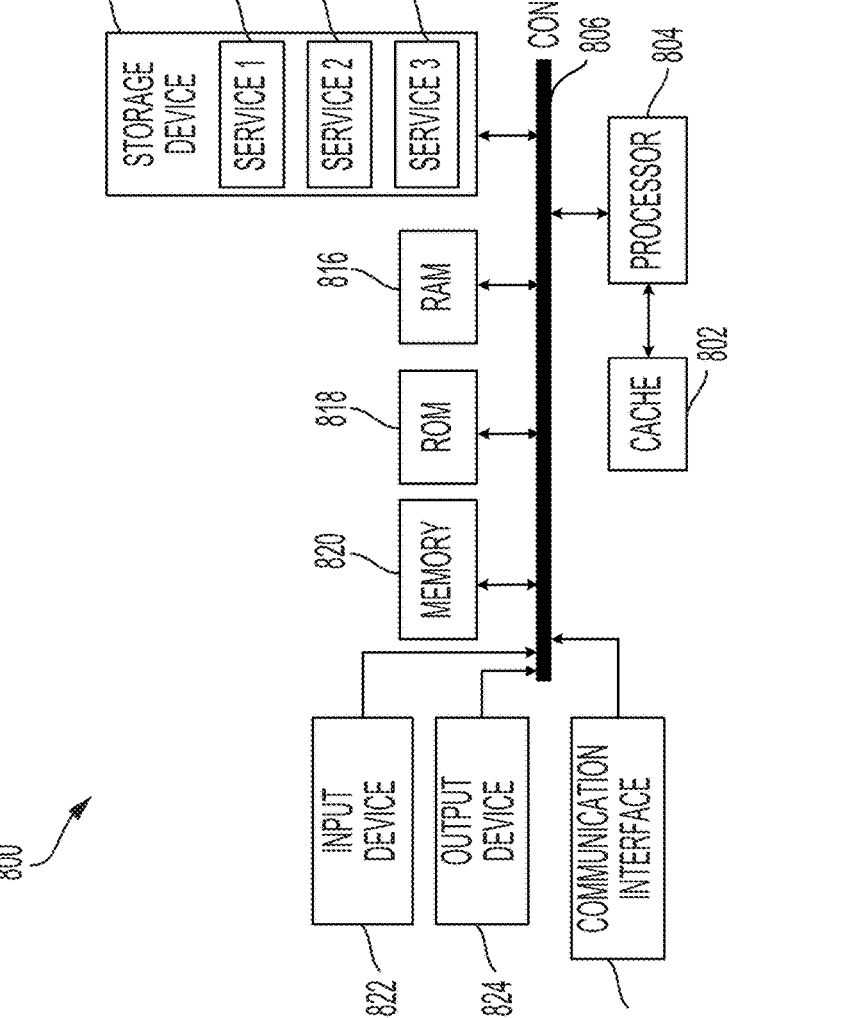
FIG. 8 shows a computing system architecture including various components in electrical communication with each other using a connection in accordance with various examples.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD- ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein,"

"above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
accessing a first transaction communication associated with a first secure transaction, the first transaction communication including a long-term token associated with a user device;
generating a first transaction token for the first transaction communication using the long-term token;
facilitating the first secure transaction using the first transaction token and the long-term token;
accessing a second transaction communication associated with a second secure transaction;
generating a second transaction token for the second transaction communication using the long-term token; and
facilitating the second secure transaction using the second transaction token and the long-term token.

2. The computer-implemented method of claim 1, wherein accessing the second transaction communication occurs during a validation of the long-term token.

3. The computer-implemented method of claim 1, further comprising generating the long-term token, wherein generating includes determining one or more expiration criteria for the long-term token.

4. The computer-implemented method of claim 3, wherein facilitating the second secure transaction includes validating the long-term token against expiration criteria.

5. The computer-implemented method of claim 1, further comprising:
rejecting a transaction request corresponding to the second transaction communication when the second transaction token is identified as previously used by a used token database; and
automatically updating an expiration threshold for the long-term token to an expired status based on the rejection of the transaction request.

6. The computer-implemented method of claim 1, further comprising:
performing checks of the long-term token against an expiration threshold;
identifying the long-term token as exceeding the expiration threshold; and
automatically transmitting a long-term token update communication.

7. The computer-implemented method of claim 1, further comprising:
updating the long-term token with an updated long-term token, wherein the long-term token is updated based on an expiration trigger; and
using the updated long-term token with the second secure transaction.

8. A system comprising:
one or more processors; and
one or more non-transitory machine-readable storage media containing instructions that, when executed on the one or more processors, cause the one or more processors to perform operations including:
accessing a first transaction communication associated with a first secure transaction, the first transaction communication including a long-term token associated with a user device;
generating a first transaction token for the first transaction communication using the long-term token;
facilitating the first secure transaction using the first transaction token and the long-term token;
accessing a second transaction communication associated with a second secure transaction;
generating a second transaction token for the second transaction communication using the long-term token; and
facilitating the second secure transaction using the second transaction token and the long-term token.

9. The system of claim 8, wherein accessing the second transaction communication occurs during a validation of the long-term token.

10. The system of claim 8, wherein when executed on the one or more processors, the instructions cause the one or more processors to perform operations including generating the long-term token, wherein generating includes determining one or more expiration criteria for the long-term token.

11. The system of claim 10, wherein facilitating the second secure transaction includes validating the long-term token against expiration criteria.

12. The system of claim 8, wherein when executed on the one or more processors, the instructions cause the one or more processors to perform operations including:
rejecting a transaction request corresponding to the second transaction communication when the second transaction token is identified as previously used by a used token database; and
automatically updating an expiration threshold for the long-term token to an expired status based on the rejection of the transaction request.

13. The system of claim 12, wherein when executed on the one or more processors, the instructions cause the one or more processors to perform operations including:
performing checks of the long-term token against an expiration threshold;
identifying the long-term token as exceeding the expiration threshold; and
automatically transmitting a long-term token update communication.

14. A non-transitory computer readable medium comprising instructions that, when executed by one or more processors of a device, cause the device to perform operations comprising:
accessing a first transaction communication associated with a first secure transaction, the first transaction communication including a long-term token associated with a user device;

generating a first transaction token for the first transaction communication using the long-term token;

facilitating the first secure transaction using the first transaction token and the long-term token;

accessing a second transaction communication associated with a second secure transaction;

generating a second transaction token for the second transaction communication using the long-term token; and facilitating the second secure transaction using the second transaction token and the long-term token.

15. The non-transitory computer readable medium of claim 14, wherein accessing the second transaction communication occurs during a validation of the long-term token.

16. The non-transitory computer readable medium of claim 14, wherein when executed on the one or more processors, the instructions cause the one or more processors to perform operations including generating the long-term token, wherein generating includes determining one or more expiration criteria for the long-term token.

17. The non-transitory computer readable medium of claim 16, wherein facilitating the second secure transaction includes validating the long-term token against expiration criteria.

18. The non-transitory computer readable medium of claim 14, wherein when executed on the one or more processors, the instructions cause the one or more processors to perform operations including:

rejecting a transaction request corresponding to the second transaction communication when the second transaction token is identified as previously used by a used token database; and automatically updating an expiration threshold for the long-term token to an expired status based on the rejection of the transaction request.

19. The non-transitory computer readable medium of claim 18, wherein when executed on the one or more processors, the instructions cause the one or more processors to perform operations including:

performing checks of the long-term token against an expiration threshold;

identifying the long-term token as exceeding the expiration threshold; and automatically transmitting a long-term token update communication.

20. The non-transitory computer readable medium of claim 14, wherein when executed on the one or more processors, the instructions cause the one or more processors to perform operations including:

updating the long-term token with an updated long-term token, wherein the long-term token is updated based on an expiration trigger; and using the updated long-term token with the second secure transaction.

* * * * *